United States Patent
Sun et al.

(10) Patent No.: US 7,639,896 B2
(45) Date of Patent: Dec. 29, 2009

(54) MULTIMODAL IMAGE REGISTRATION USING COMPOUND MUTUAL INFORMATION

(75) Inventors: Zhaohui Sun, Rochester, NY (US);
Lawrence A. Ray, Rochester, NY (US)

(73) Assignee: Carestream Health, Inc., Rochester, NY (US)

(*) Notice: Subject to any disclaimer, the term of this patent is extended or adjusted under 35 U.S.C. 154(b) by 729 days.

(21) Appl. No.: 10/914,768

(22) Filed: Aug. 9, 2004

(65) Prior Publication Data
US 2006/0029291 A1    Feb. 9, 2006

(51) Int. Cl.
G06K 9/32    (2006.01)
(52) U.S. Cl. .................. 382/294; 382/151; 382/128
(58) Field of Classification Search .......... 382/294, 382/154, 303; 600/407
See application file for complete search history.

(56) References Cited
U.S. PATENT DOCUMENTS

| | | | |
|---|---|---|---|
| 5,581,638 A | | 12/1996 | Givens et al. |
| 5,633,951 A | * | 5/1997 | Moshfeghi .................. 382/154 |
| 5,850,486 A | | 12/1998 | Maas, III et al. |
| 5,946,425 A | | 8/1999 | Bove, Jr. et al. |
| 6,009,212 A | | 12/1999 | Miller et al. |
| 6,266,453 B1 | | 7/2001 | Hibbard et al. |
| 6,343,143 B1 | | 1/2002 | Guillemaud et al. |
| 6,539,127 B1 | * | 3/2003 | Roche et al. ................. 382/294 |
| 6,563,941 B1 | | 5/2003 | O'Donnell et al. |
| 6,611,615 B1 | | 8/2003 | Christensen |
| 6,775,405 B1 | * | 8/2004 | Zhu ............................ 382/154 |
| 7,106,891 B2 | * | 9/2006 | Wyman et al. ............... 382/128 |
| 7,280,710 B1 | * | 10/2007 | Castro-Pareja et al. ...... 382/303 |
| 7,450,780 B2 | * | 11/2008 | Roche et al. ................. 382/276 |
| 2002/0122576 A1 | * | 9/2002 | Weese et al. ................. 382/131 |
| 2003/0216631 A1 | * | 11/2003 | Bloch et al. .................. 600/407 |
| 2003/0235337 A1 | | 12/2003 | Paragios et al. |
| 2004/0071367 A1 | * | 4/2004 | Irani et al. ................... 382/284 |
| 2005/0147325 A1 | * | 7/2005 | Chen et al. ................... 382/294 |

FOREIGN PATENT DOCUMENTS

WO    WO02/056241 A1    7/2002
WO    WO2004/047024 A1    6/2004

OTHER PUBLICATIONS

Image registration by maximization of combined mutual information and gradient information By Josien P. W. Pluim et al. IEEE Transactions on Medical Imaging, vol. 19, No. 8 Aug. 2000.*

(Continued)

*Primary Examiner*—Brian P Werner
*Assistant Examiner*—Jayesh Patel

(57) ABSTRACT

In a digital image registration method, a second digital image is transformed to be more like a first digital image using a modification function, resulting in a modified second digital image. A set of first features of each of the first and modified second digital images is determined. Zones are specified in each of the first and modified second digital images. A set of zonal features, of each of the zones is determined. Compound mutual information is computed from the first and zonal features. The modification function is altered. The transforming, determining, specifying, determining, computing, and altering are iterated until the compound mutual information is maximized.

30 Claims, 8 Drawing Sheets

OTHER PUBLICATIONS

Raj et al, MI-based registration of ultrasound volumes, Jan. 2002, IEEE, IEEE transactions on medical imaging, vol. 21, No. 1,0278-0062/02 pp. 9-22.*

Josien et al, Image registration by maximization of CMI information, Aug. 2000,IEEE transaction on medical imaging, vol. 19, No. 8, 0278-0062/00 pp. 809-814.*

Mutual information-based rigid and Non Rigid Registration , Ra Shekhar, IEEE, 02-0062, 2002, pp. 9-22.*

Mutual Information-based—Utrasound volumes, Raj et al. IEEE, 0278-0062/02, 2002, pp. 9-22.*

Image registration—gradient information, Joisen et al. IEEE, 0278-0062/00, 2000, pp. 809-814.*

J.B.A. Maintz and M.A. Viergever, "A Survey of Medical Image Registration", Medical Image Analysis, vol. 2 (1), pp. 1-36, (1998).

J.P.W. Pluim et al., "Mutual-Information-Based Registration of Medical Images: A Review", IEEE Transaction on Medical Imaging, vol. 22, pp. 986-1004, Aug. 2003.

P. Viola and W.M. Wells III, "Alignment By Maximization of Mutual Information", International Journal on Computer Vision, vol. 24 (2), pp. 137-154, 1997.

D. Rueckert, et al., "Non-Rigid Registration Using Higher-Order Mutual Information", Proceedings of the SPIE Conference on Medical Imaging, vol. 3979, pp. 438-447, (2000).

Frederik Maes, et al., "Multimodality Image Registration By Maximization of Mutual Information", IEEE Transactions on Medical Imaging, vol. 16, No. 2, pp. 187-198, Apr. 1997.

William M. Wells III, et al., "Multi-modal Volume Registration By Maximization of Mutual Information", Medical Image Analysis, vol. 1(1), pp. 35-51, 1996.

* cited by examiner

MULTIMODAL IMAGE REGISTRATION USING COMPOUND MUTUAL INFORMATION

CROSS REFERENCE TO RELATED APPLICATIONS

Reference is made to commonly assigned, co-pending U.S. patent application Ser. No. 10/747,594, entitled: METHOD OF IMAGE REGISTRATION USING MUTUAL INFORMATION, filed Dec. 29, 2003, in the names of Shoupu Chen, Lawrence A. Ray, Nathan D. Cahill, Marvin M. Goodgame, Cranos Williams, which is hereby incorporated herein by reference.

FIELD OF THE INVENTION

The invention relates generally to the field of digital image processing, and in particular to multimodal image registration.

BACKGROUND OF THE INVENTION

Image registration brings a floating image into spatial alignment with a reference image. This enhances image correlation, removes geometric distortion, and facilitates various image processing tasks, such as image analysis, segmentation, understanding, visualization and rendering. Image registration has wide applications in medical imaging, video motion analysis, remote sensing, security and surveillance. For example, in medical imaging using a computer aided diagnosis (CAD) system, abnormalities can be detected by frame subtraction of the same body parts after registration. Without proper image registration, there is an ambiguity between the abnormalities and the changes due to geometric distortion. In a picture archive and communication system (PACS), automatic registration of images captured at different times can enhance visualization and image rendering and help a radiologist quickly identify image changes for accurate and efficient diagnosis.

Fully automatic image registration has been successfully used in selected applications, when the images from the same modality have similar appearance and the transform involves only translation and rotation. Other cases have turned out to be quite challenging, especially when the imaging sources and the underlying motion have been unconstrained.

In multimodal image processing, images of the same body parts are captured from different modalities (for example, X-ray mammography and MRI breast imaging), which potentially can improve system performance in terms of accuracy, robustness and speed from the complementary information. Various multimodal image registration methods have been proposed. "A survey of medical image registration" by J. B. A. Maintz and M. A. Viergever, *Medical Image Analysis*, vol. 2(1), pp. 1-36, (1998); and "Mutual-information-based registration of medical images: a review" by J. P. W. Pluim, et al., *IEEE Transaction on Medical Imaging*, Vol. 22, pp. 986-1004, August 2003, provide comprehensive reviews.

The use of histogram-based mutual information (HMI) for multimodal image registration is disclosed in: "Alignment by maximization of mutual information" P. Viola and W. M Wells III, *International Journal on Computer Vision*, vol. 24(2), pp. 137-154, 1997; "Multi-modal volume registration by maximization of mutual information" W. M. Wells III, et al., *Medical Image Analysis*, vol. 1(1), pp. 35-51, 1996; and "Multimodality image registration by maximization of mutual information" F. Maes, et al., *IEEE Transactions on Medical Imaging*, vol. 16, pp. 187-198, April 1997.

Most histogram-based mutual information (HMI) methods have the shortcoming of building statistics upon an image intensity histogram and ignore spatial variations, which adversely impacts the registration accuracy and robustness. An exception which uses high order statistics is disclosed in "Non-rigid registration using higher-order mutual information" D. Rueckert, et al., *Proceedings of the SPIE Conference on Medical Imaging*, Vol. 3979, pages 438-447, (2000). This approach has the shortcoming that a compromise is made to balance the quantization levels and the number of bins (equivalent to balancing space and precision), especially when image comparison is performed regularly, such as in iterative image registration applications.

U.S. Pat. No. 6,563,941, "Model-based registration of cardiac CTA and MR acquisitions", to T. O'Donnell, et al., and U.S. Published Patent Application US2003/0216631, "Registration of thoracic and abdominal imaging modalities", by I. Bloch, et al., disclose an approach, in which a single feature is used for image representation in the registration process. This limits accuracy and robustness.

Mutual information (MI) analysis measures the dependency of two random distributions based on the Kullback-Leibler divergence. Given a random variable X, the probability density function p(X) measures the frequency of X having a particular value. The entropy of X, $$H(x) = -\Sigma p(x) \log p(x),$$

indicates its randomness. Small entropy means X is strongly biased to certain events and an entropy of zero means an event is certain. With two or more random variables X and Y, the joint probability density function p(X,Y) measures the frequency that X and Y have particular values, and p(X) and p(Y) are referred to as the marginal density functions. Similarly, the joint entropy is defined as $$H(x,y) = -\Sigma p(x,y) \log p(x,y)$$

and the mutual information can be written as $$I(x,y) = H(x) + H(y) - H(x,y)$$

It would thus be desirable to provide methods of image registration capable of handling complex images from different modalities, which use multiple image features.

SUMMARY OF THE INVENTION

The invention is defined by the claims. The invention, in broader aspects, provides methods and systems in which first and second digital images are registered. The second digital image is first transformed to be more like the first digital image using a modification function, resulting in a modified second digital image. A set of first features of each of the first and modified second digital images is determined. Zones are specified in each of the first and modified second digital images. A set of zonal features, of each of the zones is determined. Compound mutual information is computed from the first and zonal features. The modification function is altered. The transforming, determining, specifying, determining, computing, and altering are iterated until the compound mutual information is maximized.

It is an advantageous effect of the invention that improved methods of image registration are provided, which are capable of handling complex images from different modalities and use multiple image features.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
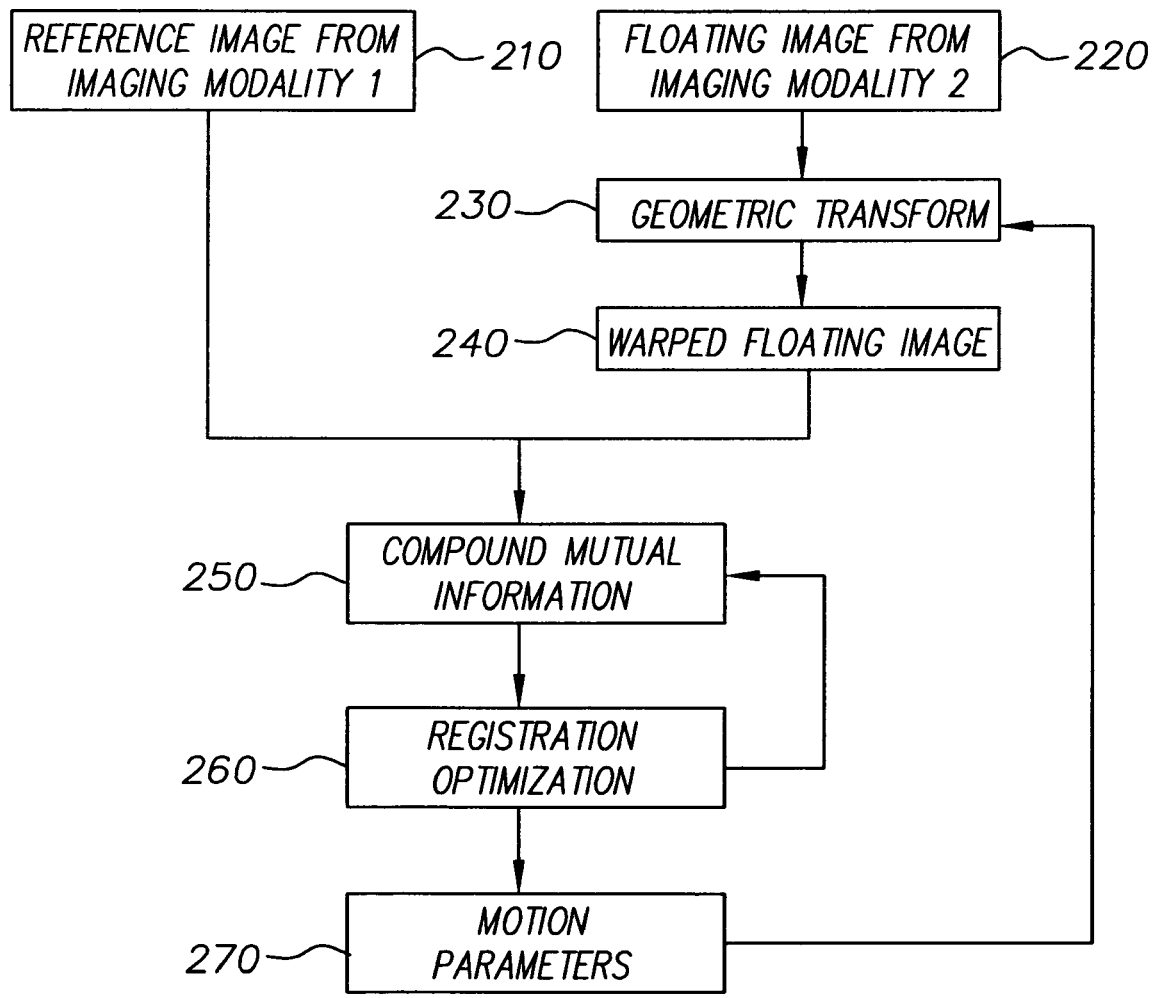
FIG. 1 shows the image registration scheme based on compound mutual information.

In the systems and methods, images are registered based on compound mutual information (CMI), which is an aggregate information measure derived from the marginal densities of the image statistics. An image defined as a random distribution on a spatiotemporal lattice has extremely high dimensionality and complexity, and it is impractical to extract the complete statistics in practice. Therefore, the methods and systems resort to a limited number of "key" features and marginal densities as an approximation, which can include statistics related to such features as the color distribution, spatial distribution, and temporal distribution.

The term "image" and like terms are used herein to refer a function defined on a multidimensional lattice, such as two dimensional (2-D) image, a three-dimensional (3-D) spatiotemporal image sequence, a 3-D volume, and four-dimensional (4-D) spatiotemporal volume sequence. The code value of an image can be a scalar for intensity, or a vector for color or other multiple channels. Accordingly, "image registration" refers to automatic alignment of two or more images, such as 2-D images, 3-D spatiotemporal image sequences, 3-D volumes, and 4-D spatiotemporal volume sequences. For convenience, image registration is discussed herein in terms of image pairs, i.e., aligning a floating image with a reference image. Registration of a larger number of images, such as, a collection of images or image sequence, is provided in a like manner, either in stages or as a single step registration of more than two images.

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

As used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 2:
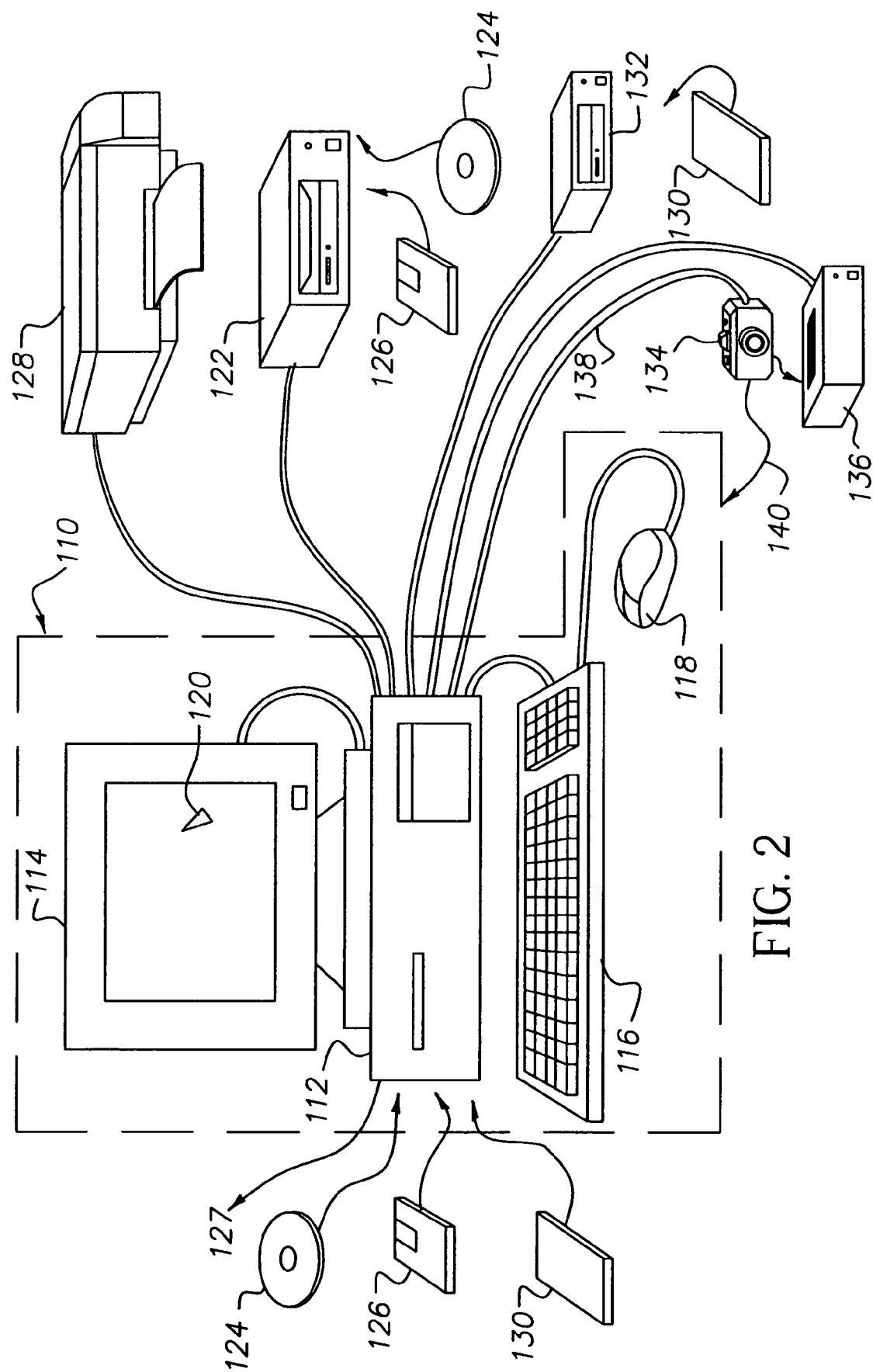
FIG. 2 is a perspective diagram of a computer system for implementing the present invention.

The present invention may be implemented in computer hardware. Referring to FIG. 2, there is illustrated a system for implementing the present invention. Although the computer system is shown for the purpose of illustrating a preferred embodiment, the present invention is not limited to the system shown, but may be used on any electronic processing system such as found in personal computers and other systems for the processing of digital images. Consequently, the computer system will not be discussed in detail herein. The images used herein can be directly input into the computer system (for example by a digital camera) or digitized before input into the computer system (for example by scanning originals, such as silver halide films).

Referring to FIG. 2, the computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122, which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor-based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device provides a final image that has been subject to the transformations. The output device can be a printer or other output device that provides a paper or other hard copy final image. The output device can also be an output device that provides the final image as a digital file. The output device can also includes combinations of output, such as a printed image and a digital file on a memory unit, such as a CD or DVD.

The present invention can be used with multiple capture devices that produce digital images. For example, FIG. 2 can represent a system, in which one of the image-capture devices is a conventional photographic film camera for capturing a scene on color negative or reversal film and a film scanner device for scanning the developed image on the film and producing a digital image. Another capture device can be a digital radiography capture unit (not shown) having an electronic imager. The electronic capture unit can have an analog-to-digital converter/amplifier that receives the signal from the electronic imager, amplifies and converts the signal to digital form, and transmits the image signal to the microprocessor-based unit.

The microprocessor-based unit 112 provides the means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone scale, image structure, etc. of digital images in a manner such that a useful image is produced by an image output device. Those skilled in the art will recognize that the present invention is not limited to just these mentioned image processing functions.

The general control computer shown in FIG. 2 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device. Before describing the present invention, it facilitates understanding to note that the present invention is preferably utilized on any well-known computer system, such as a personal computer.

It should also be noted that the present invention can be implemented in a combination of software and/or hardware and is not limited to devices, which are physically connected and/or located within the same physical location. One or more of the devices illustrated in FIG. 2 can be located remotely and can be connected via a network. One or more of the devices can be connected wirelessly, such as by a radio-frequency link, either directly or via a network.

The present invention may be employed in a variety of contexts and environments. Exemplary contexts and environments particularly relevant to combining images from different modalities include, without limitation, medical imaging, remote sensing, and security imaging related to transport of persons and goods. Other exemplary contexts and environments particularly relevant to modalities capturing visible light include, without limitation, wholesale digital photofinishing (which involves exemplary process steps or stages such as film or digital images in, digital processing, prints out), retail digital photofinishing (film or digital images in, digital processing, prints out), home printing (home scanned film or digital images in, digital processing, prints out), desktop software (software that applies algorithms to digital images), other digital fulfillment (such as digital images in—from media or over the web, digital processing, with images out—in digital form on media, digital form over the web, or printed on hard-copy prints), kiosks (digital or scanned input, digital processing, digital or scanned output), mobile devices (e.g., PDA or cell phone that can be used as a processing unit, a display unit, or a unit to give processing instructions), and as a service offered via the World Wide Web.

Images to be registered can be from the same scene at the same time and be combined to increase resolution, or can differ in terms of one or more of imaging modality, time of capture, location/field of view, and subject. This can be illustrated by examples from medical imaging. An example of an intra-modality registration is bringing X-ray chest images from the same modality into alignment. An example of a multimodal registration is aligning a mammography image and a MRI breast image. Images of the same patient can be captured at different times with different equipment, for example, before and after medical treatment. Images captured in different slices separated by spatial locations can be registered. It is also possible to register an image from a patient and with a general model presented in the form of a digital image, for example, comparing a mammography of a particular patient with a generic breast model.

Input images can be captured from different imaging modalities, such as ultrasound, visible light, X-ray, MRI, and PET. The images can utilize radiation spanning the full electromagnetic spectrum from infrared, visible light, ultraviolet, X-ray, to higher frequencies. The images can have different characteristics, including image dimension, pixel bitmap depth, noise level, and spatial sampling densities.

In each case, the method and apparatus can stand-alone or can be a component of a larger system solution. Furthermore, human interfaces, such as those for the scanning or input, the digital processing, the display to a user (if needed), the input of user requests or processing instructions (if needed), and the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

In the methods and systems, compound mutual information (CMI) is computed based on marginal densities derived various image features. CMI is an aggregate similarity measure that can be used in comparison of different images. CMI is an approximation of mutual information (MI) based on complete image statistics. (MI has extremely high dimensionality and complexity.) CMI is an aggregate measure of the marginal mutual information (MMI) based on two or more sets of marginal densities. CMI can be used as a statistical information measure of image similarity and can also be used in registering two or more images.

Sets are based upon different features. At least one of the sets of features is zonal. The terms "zone", "zonal", and like terms refer to a portion of a digital image. In the spatial domain, a zone is a geometric area of an image that is less than the entire image. (The term "global" refers to the entire image.) In the frequency domain, a zone is one or more bands of frequencies. In the space-frequency domain (for example, wavelet space), a zone is one or more wavelet coefficients in the region of support for the wavelet(s) of interest.

It is preferred that zones are mutually exclusive, such that different zones do not overlap. For example, in the spatial domain, zones can be non-overlapping blocks of the image. Non-overlapping zones are preferred, since overlap areas reduce distinctiveness of the information provided by a particular feature, reducing the effectiveness of the method.

Each zone can be continuous or discontinuous. For example, a single zone can have two or more areas of non-contiguous pixels. In particular embodiments each zone is invariant to rotation about a center of the respective zone.

The algorithm(s) disclosed herein in accordance with the invention may have interior components that utilize various data detection and reduction techniques (e.g., face detection, eye detection, skin detection, flash detection). Data produced by these and other such techniques can be used as features in the methods.

Referring to FIG. 1, in the image registration methods, a first digital image (also referred to as a "reference image") is input from a first imaging modality 210 and a second digital image (also referred to as a "floating image") is input from a second imaging modality 220. The floating image is transformed to be more like the reference image using a modification function, resulting in a modified second digital image. Next the compound mutual information is determined and the modification function is altered. The transformation, determining, and altering steps are repeated iteratively.

In the embodiment shown in FIG. 1, the transformation is a geometric transform 230 and the modified digital image is a warped floating image 240. The altering 260 of the modification function for optimization of registration provides motion parameters 270 that are used to revise the geometric transform.

The modification parameters (motion parameters in FIG. 1) can be modified heuristically, but, for efficiency, it is preferred that the modification parameters are changed using an optimization procedure. In FIG. 1, the registration optimization 260 is carried out through iterations.

A wide variety of modification functions can be used. Neither images nor the modification function are limited to a particular domain, such as spatial or frequency. The images can be changed from one domain to another, as convenient, or can be maintained continuously in a particular domain. For example, in FIG. 1, the geometric transform 230 is a spatial transform, such as translation, rotation, scaling, shear, affine, piecewise affine, and non-rigid deformable motion.

The modification function is parameterized to a set of modification parameters T (motion parameters in the embodiment of FIG. 1). The modification parameters are modified iteratively such that the misregistration of the reference and floating images is minimized. For example, in FIG. 1, the floating image is warped spatially toward the reference image such that the difference in the images gets smaller and smaller. Initially, the modified second image 240 is conveniently left the same as the input second image 220, by initializing the transform as an identity motion. Next the compound mutual information 250 is computed from the reference image 210 and the warped floating image 240. This measures the statistical similarity between the image pair. A large CMI indicates that the two images are closely correlated and share more mutual information. Compound mutual information is maximized by adjusting the geometric transform. The updated motion parameters 270 are used to warp the floating image 220 toward the reference image such that the geometric distortion in gradually minimized until both images are spatially registered.

The compound mutual information is defined as an aggregate of the marginal mutual information from a set of marginal densities extracted from image distributions A and B, $$I(A, B) = \sum_{m=1}^{M} \left( \lambda_m \sum_{h_a h_b} \left( p(h_a^m, h_b^m) \log \frac{p(h_a^m, h_b^m)}{p(h_a^m)p(h_b^m)} \right) \right)$$

where A and a signify the first digital image, B and b signify the second modified digital image, M is the total number of sets of global and zonal features, $p(h_a^m)$, $p(h_b^m)$ and $p(h_a^m, h_b^m)$ are marginal densities derived from image features $\{h^m\}_{m=1}^{M}$, and $\lambda_m$ are weighting coefficients, where $$\sum_m \lambda_m = 1.$$

The CMI is essentially a linear combination of M marginal mutual information (MMI). Due to their low dimensionality, the marginal densities $p(h_a^m)$, $p(h_b^m)$, and $p(h_a^m, h_b^m)$ can be readily estimated from image features of images A and B. The weighting coefficients $\lambda_m$, where $$\sum_m \lambda_m = 1,$$

specify the relative contribution of the MMI to the CMI, and can be adjusted for specific dataset or learned from examples. Being a linear combination, all the properties held by mutual information automatically hold for the CMI, such as nonnegativity, independence, symmetry, self-information, boundedness, and data processing.

In the methods and systems, the CMI is computed using at least two sets of features, of which at least one of those two sets is zonal. The other set is zonal or global. Additional sets can be zonal or global in any combination.

Global features relate to properties of the images as a whole. Examples of global features include: intensity/color histogram, average grayscale value, spatial frequency histogram (in frequency domain), and standard deviations and higher order statistics relating to other features, such as intensity.

Zonal features are selected from the same characteristics as the global features, but are limited to a zone of a particular shape. Ring (2-D images)/shell (3-D images) shaped zones are currently preferred, in that these shapes provide for relatively efficient computation of the CMI.

In a particular embodiment, the CMI is computed using a marginal density $p(h_0)$ derived from a single global feature and marginal densities $p(h_k)$ derived from one or more zonal features. The global feature is an intensity/color histogram $h_0$, which indicates the probability of an image pixel having a particular intensity code value. The marginal density based on the intensity/color histogram $h^0$, is defined as $$p(h^0) = p\{I(s) = n | s \in S, n \in N\}$$

$$p(h_a^0, h_b^0) = p\{I_a(s) = n_a, I_b(s) = n_b | s \in S, n_a \in N_a, n_b \in N_b\}$$

where $p(h^0)$ is the probability of pixel s having intensity code values n, $p(h_a^0, h_b^0)$ is the probability of joint histogram, i.e., a pixel s having intensity code value $n_a$ on image A and code value $n_b$ on image B at the same location, S indicates the pixels sites, and N defines all the possible intensity code values.

Figure 5:
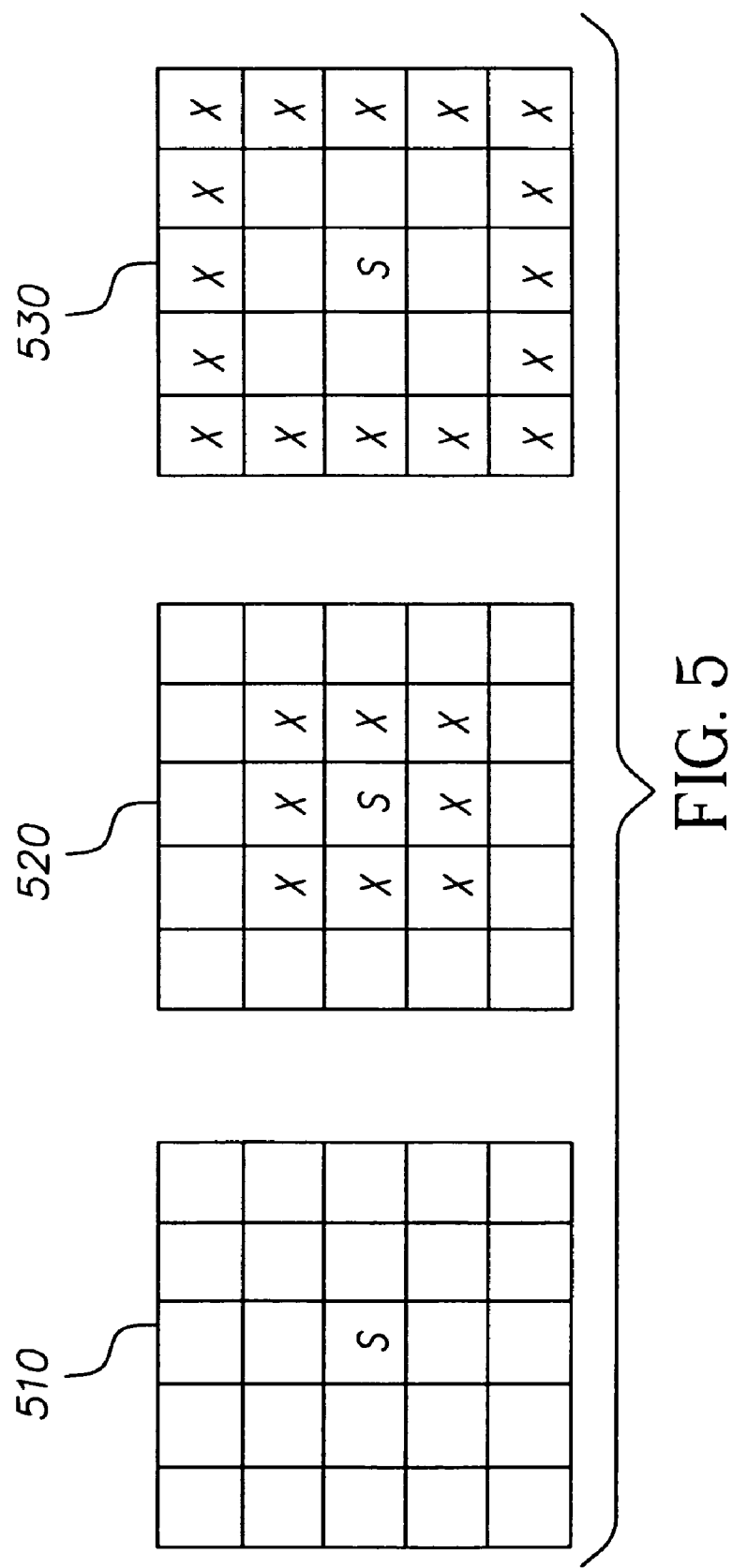
FIG. 5 depicts the ring structure of the neighboring pixels with distances of 0, 1, and 2.

In this particular embodiment, the zonal features provide marginal densities that indicate the probability of the neighboring pixels having intensity values no less than that of the central pixel. The sets of zonal features provide marginal densities $p(h_k)$, where k=0, 1, 2, . . . . The spatial neighbors at a distance k from the pixel. As the distance k grows, the zone covers a larger and larger spatial neighborhood in the shape of a ring or shell. For example, on a 2-D image in FIG. 5, 8 k distance neighbors on a ring structure are involved, and $p(h_k)$ indicates the chance of the neighbors having intensity values no less than that of the central pixel. The zonal features add spatial information to the definition of the marginal densities by considering the neighboring pixels as well, $$p(h^k) = p\{I(s') \geq I(s) = |I(s) = n, |s' - s| = k, s, s' \in S, n \in N\}$$

$$p(h_a^k, h_b^k) = p\{I_a(s') \geq I_a(s), I_b(s') \geq I_b(s) | I_a(s) = n_a, I_b(s) = n_b, |s' - s| = k, s, s' \in S, n_a \in N_a, n_b \in N_b\}$$

where k>0 is the distance between pixel s' and pixel s, $p(h^k)$ is the probability of the neighboring pixels having intensity values no less than that at a central pixel s with intensity value of n, and $p(h_a^k, h_b^k)$ is the joint probability of the neighboring pixels on images A and B having intensity values no less than those at the central pixel location s with intensity $n_a$ on A and intensity $n_b$ on B. The probabilities of $p(h^k)$ are exclusively independent with respect to distance k.

The pixel distance is defined as $L_\infty$ norm, that is, $$|s' - s| = \max\{|x' - x|, |y' - y|\},$$

leading to a ring structure on a 2-D image or a shell structure on a 3-D/4-D volume. As an example shown in FIG. 5 for k=0, 1, 2, there are 8 k neighboring pixels in the ring structure having a distance of k from the central pixel s, and $p(h^k)$ specifies the probability of the pixels in the ring having intensity values no less than that at the central pixel. In 510, only the current pixel s is considered and no spatial information is encoded. In 520, 8 neighboring pixels are involved, and in 530, a total of 16 neighboring pixels with a distance of 2 are involved. Such ring structure encodes the spatial color distribution, and the compound mutual information derived from these structures can improve image registration in terms of accuracy and robustness. Similar structure can be extended to higher dimensions as shells. The ring/shell structure is rotation invariant about the center pixel.

Figure 6:
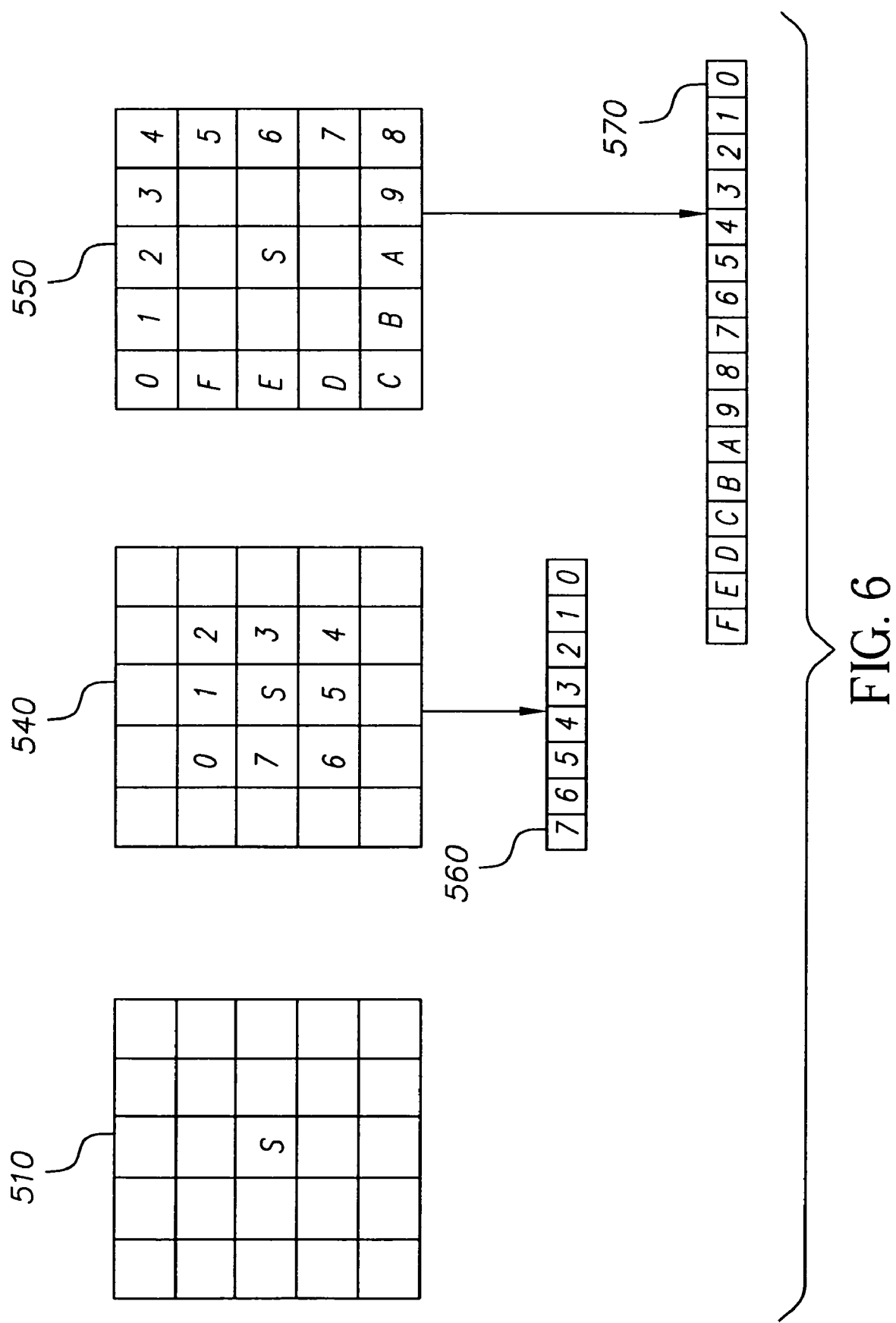
FIG. 6 depicts the coding of the neighboring pixels with distances of 0, 1, and 2.

An example of another type of zonal feature is a binary value 1/0 of a neighboring pixel having a larger or smaller/the same intensity value than the central pixel. Neighboring pixels can be determined in the same rings/shells as just described. The marginal densities $p(h_k)$ indicate the occurrence probability of these ordered data structures at different distances k. This approach has an advantage that the locations of the neighboring pixels can be encoded into an ordered data structure (such as the binary bits, bytes, and words shown in FIG. 6). The pixels are encoded based on their location on the ring structures. In 540, the 8 neighbors are coded by a byte with 8 bits, each with a value of 0 or 1, indicating that the corresponding pixel having a code value no less than, or smaller than, that at the central pixel s. In order to reduce sensitivity to image noise, the decision is based upon whether the difference between the corresponding pixel and the central pixel s is less than some predetermined value. In 550, the 16 neighbors are coded by two bytes with 16 bits. The probabilities of the position-encoded bytes are collected for all the image pixels, and the compound mutual information is derived from the marginal densities, yielding a similarity measure capturing the spatial color distribution in the images. Such position-coded marginal densities vary with image rotation, however; a simple transformation will produce the particular probability distribution when the image is rotated by multiples of 45 degrees.

The contribution and expressiveness of the different features are controlled by the weighting coefficients λi. By choosing different weighting coefficients, key features can be selected for efficient computation. The feature selection process can be carried out by learning-from-examples or feature-tuning.

Figure 3:
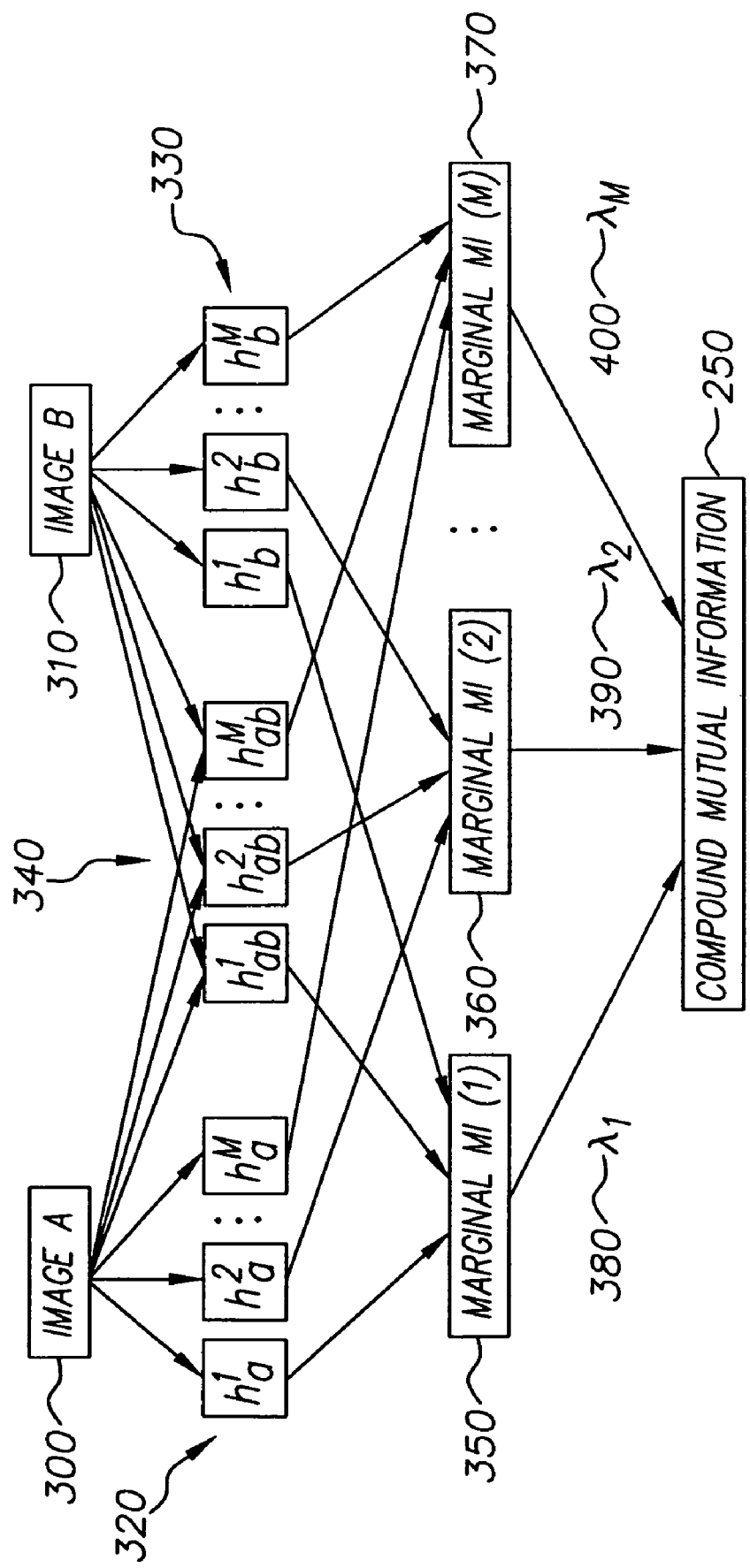
FIG. 3 presents the computational details of the compound mutual information from a plurality of marginal densities derived from various image features.

Referring now to FIG. 3, the determination of the compound mutual information is shown. Given image A 300, image B 310, and a set of predefined image features, $h_1$, $h_2$, . . . , $h_M$, the marginal densities of the selected image features are extracted from image A as $h_a^1, h_a^2, \ldots, h_a^M$ in module 320 and from image B, as $h_b^1, h_b^2, \ldots, h_b^M$ in module 330, and the joint densities are extracted as $h_{ab}^1, h_{ab}^2, \ldots, h_{ab}^M$ in module 340. Each marginal density leads to marginal mutual information 350 measuring the similarity between image A and image B based on particular image characteristics. The marginal mutual information is linearly combined as a compound mutual information in module 250, with the contribution controlled by the weighting coefficients $\lambda_1$, $\lambda_2, \ldots, \lambda_M$. To this end, the compound mutual information is an aggregate statistical similarity measure between images A and B. A large CMI indicates the images share more common information and have stronger correlation. It is important to select a compact set of image features, which are effective and efficient to capture the image characteristics. It is also important to tune and learn the weighting coefficients to explore the feature dependency and effectiveness.

Figure 4:
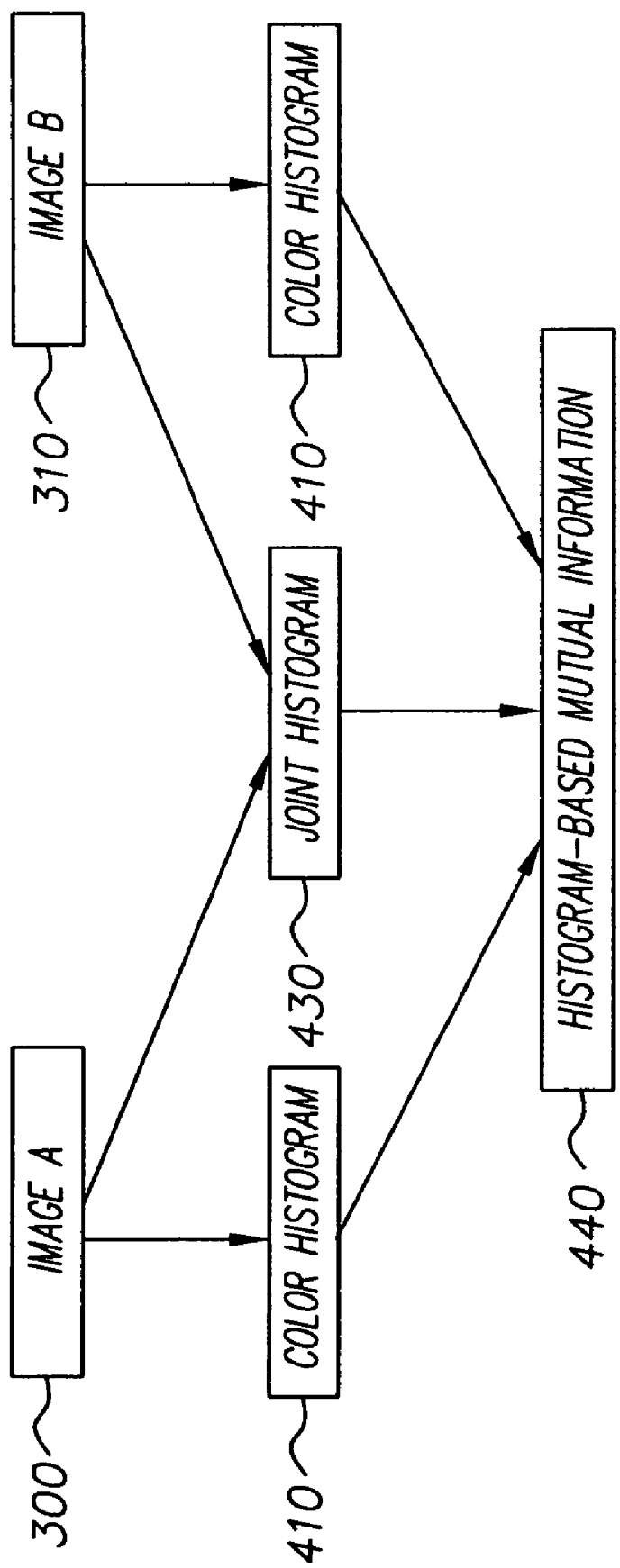
FIG. 4 shows the computational procedure for the prior art histogram-based mutual information procedure.

As a comparison, FIG. 4 presents a computational procedure for histogram-based mutual information, which is widely used in the previous disclosed mutual-information-based registration schemes. As shown in the figure, only a single image feature, the color histogram 410, is extracted from image A 300 and image B 310, and a histogram-based mutual information 440 is computed from the marginal densities based on the color histogram 410 and the joint histogram 430. This is equivalent to one of the marginal mutual information 350 presented in FIG. 3. The color histogram procedure has been shown to be invariant to rotation, efficient for representation and computation, and effective for pattern matching, however; spatial information is missing. Any permutation of the individual pixels will produce the same histogram. Consequently, two images may appear totally different while having the same histogram, and accordingly the histogram-based mutual information may not change even if one of the images undergoes certain geometric or appearance transform.

Referring to FIG. 1, the registration optimization 260 is carried out in order to decide how to change the modification parameters. Having the expression for the compound mutual information, image registration is achieved by maximization of the information measure. Two representative optimization approaches are shown in FIGS. 7-8.

Figure 7:
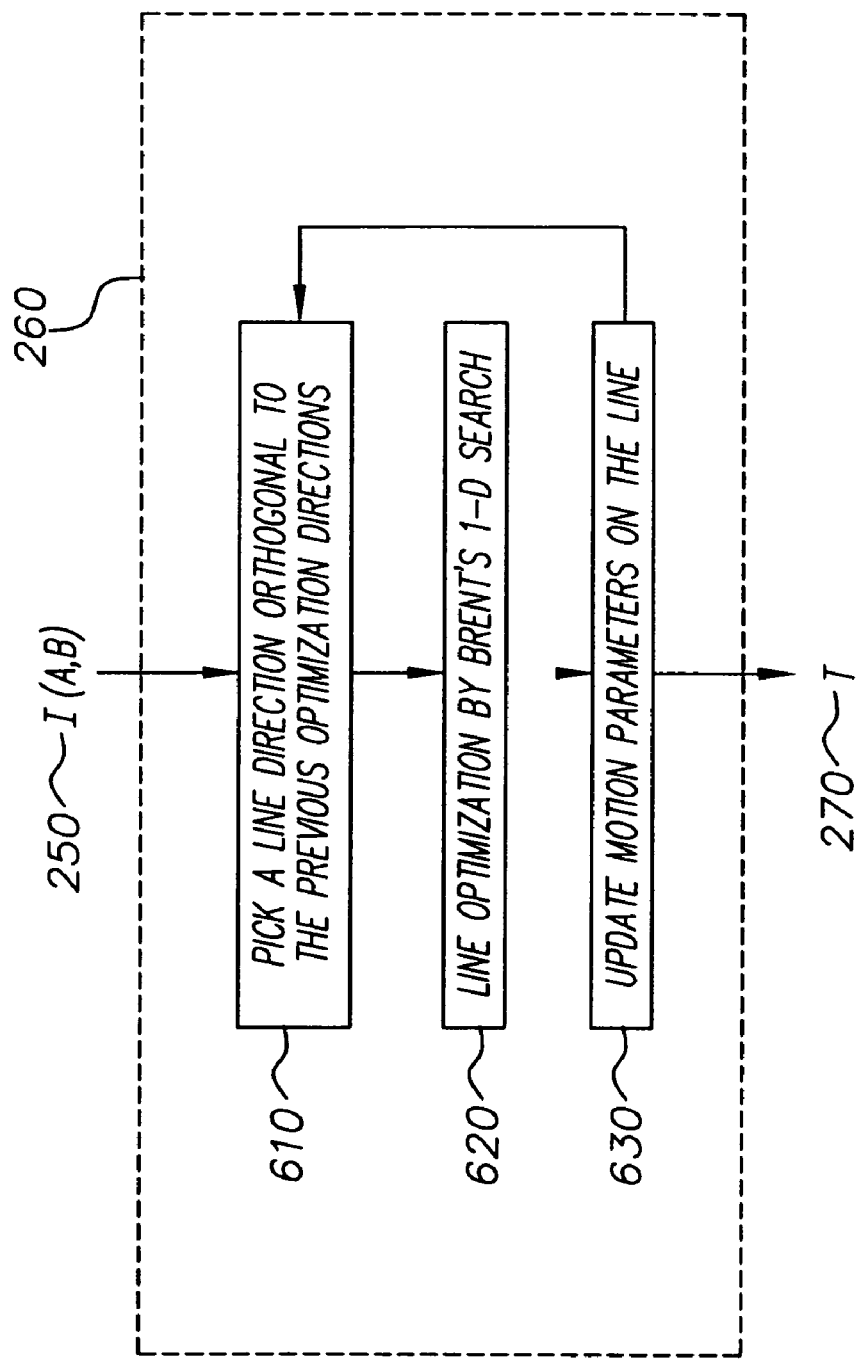
FIG. 7 is a preferred embodiment of registration optimization based on Powell's multidimensional direction set method with Brent's 1-D line search.

Referring to FIG. 7, the first approach is to search the motion parameters in an efficient way without computing the gradients. The optimization is carried out by Powell's multi-dimensional direction set method. It is assumed that the motion parameters span a Q-dimensional space, and a line in the parameter space is chosen in 610. The best motion parameters are searched on the line using Brent's method in module 620, yielding a local maximum of the compound mutual information. The corresponding motion parameters are updated in 630. Next, another line direction, orthogonal to the previous line directions, in the parameter space is chosen, and 1-D optimization is repeated through searching. The 1-D searching repeats for Q orthogonal line directions, and the whole process is iterated until convergence. During the iteration, the initial line direction and the order of the line searches may be randomly reshuffled.

Figure 8:
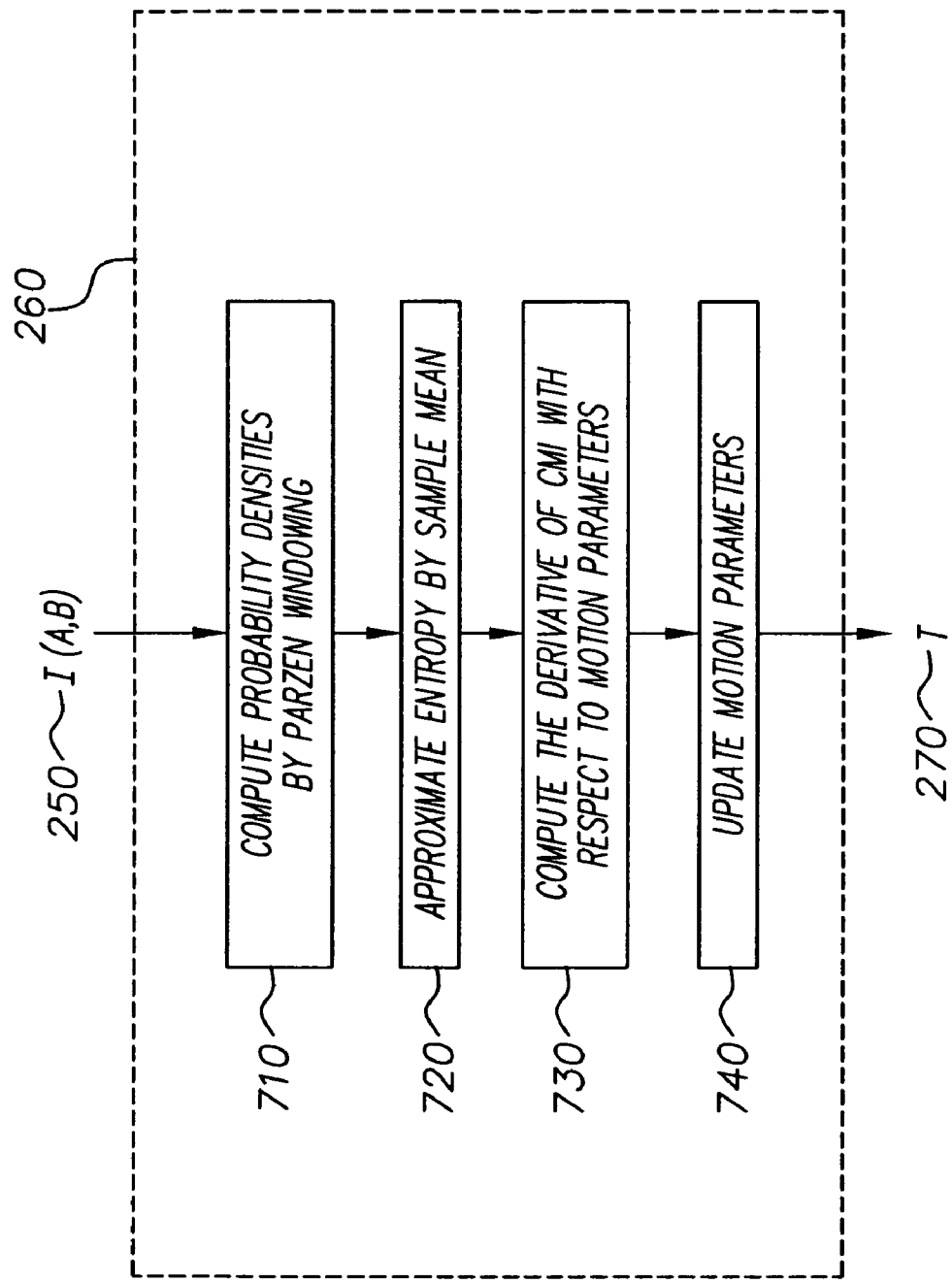
FIG. 8 shows a preferred embodiment of registration optimization based on Parzen windowing and gradient descent.

Referring to FIG. 8, the second approach uses Parzen windowing and gradient descent. The probability density function used in CMI is estimated through Parzen windowing, that is, a mixture of Gaussian densities, in module 710, and the estimate is carried out efficiently by sampling. Instead of processing every single pixel, only a small number of pixels and their code values are used to approximate the mixture Gaussian densities and the marginal densities. For efficient computation, sample means are employed in place of integral in the computation of entropy in module 720, which can greatly speed up the process. Next, the gradient of the CMI with respect to the motion parameters $$\frac{\partial I(A, B)}{\partial T}$$

is computed in module 730, which turns out to be a linear combination of the gradient of the MMI with respect to the motion parameters. The motion parameters T are updated iteratively through gradient descent $$T = T + \mu \frac{\partial I(A, B)}{\partial T}$$

in module 740. The process repeats through iteration until it converges with the maximal compound mutual information and the optimal motion parameters T.

There are numerous potential applications for the methods and systems. One example is in a Picture Archive and Communication System (PACS) system. One of the difficulties in a PACS system is that there are many sources for changes in appearance of an image, such as structural and anatomical changes, appearance changes (e.g., soft tissue may appear quite differently under different imaging modalities), and geometric misalignment. By removing the geometric distortion, the methods help a radiologist focus on the relevant changes, i.e., the structural and anatomical changes, not the irrelevant ones.

The disclosed invention can be used in a Computer Aided Diagnosis (CAD) system involving image/volume processing, analysis, segmentation, understanding, visualization and rendering. Different imaging modalities provide complementary information. Automatic registration helps information fusion from various sources for better medical care. For example, the boundary between soft tissue and malignant tumor may not be clear under X-ray, however, it can be picked up by a different imaging technique. The complete boundary information helps tumor segmentation, analysis of the tumor size and the growth rate, thus facilitating medical diagnosis and staging.

The disclosed invention can be used in remote sensing applications, e.g., in the air, in the space, under the ground, and under the water. Electromagnetic waves at different frequencies behave quite differently when interacting with objects with different geometric scale, physical and chemical characteristics. For example, in geographical survey, certain frequency can easily pick up water and snow while other frequencies are more effective for forest, dry land, and desert. The complementary information from different frequency bands helps paint a bigger and clearer picture.

The disclosed invention can also be used in security applications. For example, in a traffic control and monitoring system, it is common to use different sensors to capture optical images, infrared images, and X-ray images. Automatic registration facilitates various applications, such as detecting and locating objects of interests.

The invention has been described in detail with particular reference to certain preferred embodiments thereof, but it will be understood that variations and modifications can be effected within the spirit and scope of the invention.

The invention claimed is:

1. A method for registering first and second digital images captured using first and second different capture modalities, said method comprising the steps of:

transforming said second digital image in the second modality to be more like said first digital image in the first modality using a modification function, to provide a modified second digital image;

determining a set of first features of each of said first and modified second digital images;

specifying mutually exclusive zones in each of said first and modified second digital images where each of the specified mutually exclusive zones is less than an entirety of each of said first and modified second digital images;

determining a set of zonal features of each of said specified mutually exclusive zones of each of said first and modified second digital images;

computing compound mutual information from said first features and said zonal features where compound mutual information comprises an aggregate measure of mutual information;

altering said modification function; and iterating said transforming, determining, specifying, determining, computing, and altering steps until said compound mutual information is maximized,
wherein said computing further comprises:
(1) extracting a set of global marginal densities from a set of global features and a set of zonal marginal densities from said set of zonal features, and
(2) applying weighting coefficients to said sets of marginal densities to provided weighted marginal mutual information, and aggregating said weighted marginal mutual information in accordance with the formula:

$$I(A, B) = \sum_{m=1}^{M} \left( \lambda_m \sum_{h_a h_b} \left( p(h_a^m, h_b^m) \log \frac{p(h_a^m, h_b^m)}{p(h_a^m) p(h_b^m)} \right) \right)$$

where
A and a signify the first digital image;
B and b signify the modified second digital image;
M is the total number of sets of global and zonal features;
$p(h_a^m)$, $p(h_b^m)$ and $p(h_a^m, h_b^m)$ are marginal densities derived from image features $\{h^m\}_{m=1}^M$; and
$\lambda_m$ are weighting coefficients, where $$\sum_m \lambda_m = 1.$$

2. The method of claim 1 wherein said zonal features are different than said first features.

3. The method of claim 1 further comprising, following said iterating, using said modified second digital image in place of said second digital image.

4. The method of claim 1 wherein said first features are global.

5. The method of claim 4 further comprising, prior to said computing, determining at least one other set of global features of each of said first and modified second digital images.

6. The method of claim 5 wherein said first features are intensity/color histograms.

7. The method of claim 1 wherein said specified mutually exclusive zones define ring/shell shapes.

8. The method of claim 1 wherein said specified mutually exclusive zones each include a center pixel and a plurality of neighboring pixels, said neighboring pixels being encoded based on respective locations relative to said center pixel.

9. The method of claim 1 wherein said specified mutually exclusive zones are each rotation invariant relative to the center of the respective zone.

10. The method of claim 1 wherein said specifying and said determining of said set of zonal features are concurrent.

11. The method of claim 1 further comprising, prior to said computing, designating at least one set of other zones in each of said first and modified second digital images, and determining at least one other set of zonal features of each of said other zones of each of said first and modified second digital images.

12. The method of claim 11 wherein said at least one set of other zones of each of said sets of features are at different distances from respective center pixels.

13. The method of claim 11 wherein said at least one set of other zones define ring/shell shapes.

14. The method of claim 1 wherein at least one of said determining steps includes converting said first and modified second digital images from spatial domain to one of frequency domain and space-frequency domain.

15. The method of claim 1 wherein said modification function is a geometric transform.

16. The method of claim 1 further comprising maintaining said digital images in one of the frequency domain and the space-frequency domain during one or more of said transforming, determining, specifying, determining, computing, altering, and iterating steps.

17. The method of claim 1 further comprising continuously maintaining said digital images in one of frequency domain and space-frequency domain during all of said transforming, determining, specifying, determining, computing, altering, and iterating steps.

18. The method of claim 1 further comprising continuously maintaining said digital images in spatial domain during all of said transforming, determining, specifying, determining, computing, altering, and iterating steps.

19. The method of claim 1 wherein said zonal features are spatial neighborhood properties.

20. The method of claim 1 wherein said sets of global features are intensity histograms.

21. The method of claim 1 further comprising optimizing said altering.

22. The method of claim 21 wherein said optimizing utilizes a multidimensional direction set.

23. The method of claim 21 wherein said optimizing utilizes windowing and gradient decent.

24. The method of claim 1 wherein said first and second digital images are products of different modalities.

25. The method of claim 1 wherein at least one of said modalities is selected from the group consisting of: ultrasound images, infrared images, visible light image, X-ray images, MRI images, and PET images.

26. The method of claim 1 wherein said first and second images differ in at least one of: image dimension, pixel bit depth, noise characteristics, and spatial sampling density.

27. A system for registering first and second digital images captured using first and second different capture modalities, said method comprising the steps of:
means for transforming said second digital image in the second modality to be more like said first digital image in the first modality using a modification function, to provide a modified second digital image;
means for determining a set of first features of each of said first and modified second digital images;
means for specifying mutually exclusive zones in each of said first and modified second digital images where each of the specified mutually exclusive zones is less than an entirety of each of said first and modified second digital images;
means for determining a set of zonal features of each of said specified mutually exclusive zones of each of said first and modified second digital images, said zonal features being different than said first features;
means for computing compound mutual information from said first features and said zonal features where compound mutual information comprises an aggregate measure of mutual information;
means for altering said modification function; and
means for iterating said transforming, determining, specifying, determining, computing, and altering steps until said compound mutual information is maximized,
wherein said means for computing further comprises:
(1) means for extracting a set of global marginal densities from a set of global features and a set of zonal marginal densities from said set of zonal features, and (2) means for applying weighting coefficients to said sets of marginal densities to provided weighted marginal mutual information, and aggregating said weighted marginal mutual information in accordance with the formula:

$$I(A, B) = \sum_{m=1}^{M} \left( \lambda_m \sum_{h_a h_b} \left( p(h_a^m, h_b^m) \log \frac{p(h_a^m, h_b^m)}{p(h_a^m) p(h_b^m)} \right) \right)$$

where:
A and a signify the first digital image;
B and b signify the modified second digital image;
M is the total number of sets of global and zonal features;
$p(h_a^m)$, $p(h_b^m)$ and $p(h_a^m, h_b^m)$ are marginal densities derived from image features $\{h^m\}_{m=1}^{M}$; and
$\lambda_m$ are weighting coefficients, where $$\sum_m \lambda_m = 1.$$

28. The method of claim 27 further comprising, following said iterating, using said modified second digital image in place of said second digital image.

29. A computer program product for registering first and second digital images captured using first and second different capture modalities, the computer program product comprising computer readable storage medium having a computer program stored thereon for performing the steps of:
transforming said second digital image in the second modality to be more like said first digital image in the first modality using a modification function, to provide a modified second digital image;
determining a set of first features of each of said first and modified second digital images;
specifying mutually exclusive zones in each of said first and modified second digital images where each specified mutually exclusive zone is less than an entirety of each of said first and modified second digital images;
determining a set of zonal features of each of said specified mutually exclusive zones of each of said first and modified second digital images;
computing compound mutual information from said first features and said zonal features where compound mutual information comprises an aggregate measure of mutual information;
altering said modification function; and
iterating said transforming, determining, specifying, determining, computing, and altering steps until said compound mutual information is maximized,
wherein said computing further comprises:
(1) extracting a set of global marginal densities from a set of global features and a set of zonal marginal densities from said set of zonal features, and
(2) applying weighting coefficients to said sets of marginal densities to provided weighted marginal mutual information, and aggregating said weighted marginal mutual information in accordance with the formula:

$$I(A, B) = \sum_{m=1}^{M} \left( \lambda_m \sum_{h_a h_b} \left( p(h_a^m, h_b^m) \log \frac{p(h_a^m, h_b^m)}{p(h_a^m) p(h_b^m)} \right) \right)$$

where:
A and a signify the first digital image;
B and b signify the modified second digital image;
M is the total number of sets of global and zonal features;
$p(h_a^m)$, $p(h_b^m)$ and $p(h_a^m, h_b^m)$ are marginal densities derived from image features $\{h^m\}_{m=1}^{M}$; and
$\lambda_m$ are weighting coefficients, where $$\sum_m \lambda_m = 1.$$

30. The method of claim 1 wherein said first and second different modalities comprise an X-Ray image capture modality and a magnetic resonance image capture modality.

* * * * *